United States Patent [19]

Ginaven

[11] 4,235,724
[45] Nov. 25, 1980

[54] HIGH CAPACITY WASTE WATER TREATMENT SYSTEM

[75] Inventor: Marvin E. Ginaven, Springfield, Ohio

[73] Assignee: The Bauer Bros. Co., Springfield, Ohio

[21] Appl. No.: 944,545

[22] Filed: Sep. 21, 1978

[51] Int. Cl.³ .............................................. B01D 23/02
[52] U.S. Cl. ................................. 210/323 R; 210/409; 210/499
[58] Field of Search ............ 210/264, 298, 322, 323 R, 210/409, 433 R, 499

[56] References Cited

U.S. PATENT DOCUMENTS

| 187,966 | 3/1877 | Cook | 210/264 |
|---|---|---|---|
| 1,165,741 | 12/1915 | Amos | 210/323 R |
| 2,029,655 | 2/1936 | Coulter | 210/323 R X |
| 2,312,764 | 3/1943 | Lubke | 210/323 R X |
| 2,395,508 | 2/1946 | Seddig | 210/264 |
| 2,557,064 | 6/1951 | Alexander | 210/323 R |
| 3,452,876 | 7/1969 | Ginaven | 210/409 |
| 3,833,123 | 9/1974 | Walker | 210/499 X |

FOREIGN PATENT DOCUMENTS

| 173371 | 5/1952 | Austria | 210/323 R |
| 94863 | 11/1897 | Fed. Rep. of Germany | 210/323 R |

Primary Examiner—Robert H. Spitzer
Attorney, Agent, or Firm—Jerome P. Bloom

[57] ABSTRACT

A waste water treatment system comprises a plurality of screens presenting descending flow surfaces and means defining a flow conduit for waste water or sewage arranged below the upper limits of said flow surfaces. The construction of the flow conduit is such to induce an upflow of the waste water by way of openings therein which are constantly open to means which direct the waste water to the upper ends of said screens in a manner to provide a substantially equal volumetric flow to and over each of said screens.

18 Claims, 5 Drawing Figures

HIGH CAPACITY WASTE WATER TREATMENT SYSTEM

BACKGROUND OF THE INVENTION

This invention relates to improvements in waste water treatment systems rendering such systems more efficient and satisfactory in use. Embodiments are easy to fabricate and capable of a ready and economical expansion. They enable a flexible high capacity waste water treatment system at a minimal cost and provide a solution to problems long evidenced in the prior art.

Systems for waste water treatment have generally comprised a composite of settling tanks and clarifiers for extracting heavy solids and skimmers for extracting floatable solids. Their use involves a high initial cost, a considerable amount of maintenance and requires a substantial consumption of energy. Their biggest drawback, however, is their inability to handle a high volume turbulent flow of waste water with any degree of separating efficiency. When, for example, a sewage system is faced with a heavy infiltration of water due to heavy rains and/or flooding conditions, the associated waste water treatment system in accordance with the prior art cannot properly handle the sewage flow directed thereto for treatment. In most instances large amounts of the waste water (sewage) which it should treat flows out of the system and reaches and pollutes the surrounding environment.

The waste water treatment systems as heretofore known cannot be readily modified to overcome the noted problems in their use since to do so their component separators must be made of a size that their cost is prohibitive.

The problems described are obviated in use of embodiments of the present invention.

The inventor and those involved in the preparation of the present disclosure know of no prior art which reveals the points of novelty of the present invention. However, preferred embodiments of the present invention will include static screen units of the "Hydrasieve" type, such as manufactured and sold by The Bauer Bros. Co. of Springfield, Ohio, U.S.A. These are exemplified in U.S. Pat. No. 3,452,876 (Hydrasieve) and U.S. Pat. No. Des. 229,055.

SUMMARY OF THE INVENTION

A system in accordance with the present invention, for treatment of waste water received from a sewer system, will comprise one or more lines of static inclined screens each of which lines is served by a single low lying infeed duct or conduit connected to receive waste water which is discharged from the associated sewage system. Each infeed duct includes means defining a plurality of longitudinally spaced outlets directed upwardly and vertically thereof and is so constructed and arranged to provide a like delivery of waste water embodying solids to each of the screens served thereby.

Each infeed duct is so designed and interrelated with the line of screens which it serves that each of the screens in the line is provided with a substantially equal volumetric non-turbulent, quiescent flow which is ideal for separating purposes. This is achieved by stepping the cross-sectional area of the infeed duct to achieve a substantially uniform flow velocity at each of its outlets.

The net result is that each of the static inclined screens adds a substantially equal increment of solids separating capacity to the waste water treatment system of which it forms a part. By such means one can predetermine the requirements of any installation with a high degree of accuracy, thereby simplifying the design of a given capacity system and insuring economy in its installation.

The invention system is exceedingly compact and may require no moving parts, the only valving means necessary being that employed in connection with the main sewage line or lines to which the system connects.

Per a preferred embodiment of the present invention the main sewage line in this case would have a normally closed valve in each of its branches which connects to an infeed duct serving a line of screens as above described. As herein contemplated the level of the waste water in each branch would determine whether or not an inserted sensing device would trigger the opening of the normally closed valve therein and thereby a flow of waste water to and through the associated infeed duct.

A primary object of the invention is to provide a waste water treatment system which is economical to fabricate, more efficient and satisfactory in use, adaptable to a wide variety of applications and unlikely to malfunction.

Another object is to provide such a system which is capable of handling, with a high degree of efficiency, a high volume of turbulent waste water such as found in a system of sewage lines wherein the sewage has been infiltrated with large volumes of water due to heavy rains and/or flooding conditions.

A further object is to provide a compact waste water treatment system featuring the use of a line or lines of static inclined screens each of which lines is served by a conduit for waste water to be treated thereby, which conduit is so interconnected and designed to direct waste water to and over each of the screens in a non-turbulent quiescent manner and in substantially equal volumes of flow.

Another object is to provide a means for reducing high flow velocities in incoming storm water and the like and producing substantially equal static pressures and feed rates to each screen in a waste water treatment system.

An additional object of the invention is to provide a waste water treatment system possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein one but not the only form of embodiment of the invention is illustrated, FIG. 1 is a generally diagrammatic side elevation view of one embodiment illustrating a single line operation of a system for handling waste water in accordance with the present invention;

Like parts are indicated by similar characters of reference throughout the several views.

Figure 1:
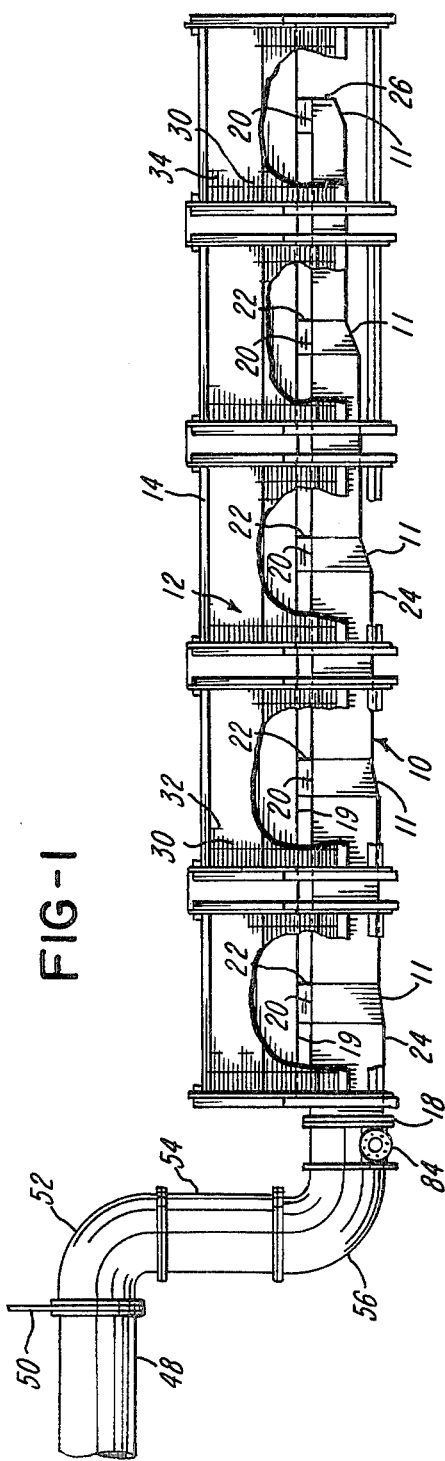

An operating line of a system per the present invention shown in FIGS. 1-4 comprises in the main an infeed duct or conduit 10 and a series of static inclined screens 12. Each of the screens has the upper end of its downwardly and outwardly inclined flow surface communicating with and forming an extension of the weir-like overflow lip 14 of a head box 16 which positions over and in spaced elevated relation to the infeed duct 10.

The infeed duct 10 has an inlet 18 and a series of longitudinally spaced outlets 20 each defined by an opening in its upper surface which is rimmed and vertically extended by a short duct section 22 the upper end of which opens into the bottom of the head box 16.

In the example shown, the infeed duct 10 is rectangular in cross section and further distinguished by an upwardly stepped configuration of its bottom 24 which gradually reduces its depth from its inlet end 18 to its remote end 26, the latter of which is closed. The only outlets from the infeed duct 10 are at its top.

Figure 2:
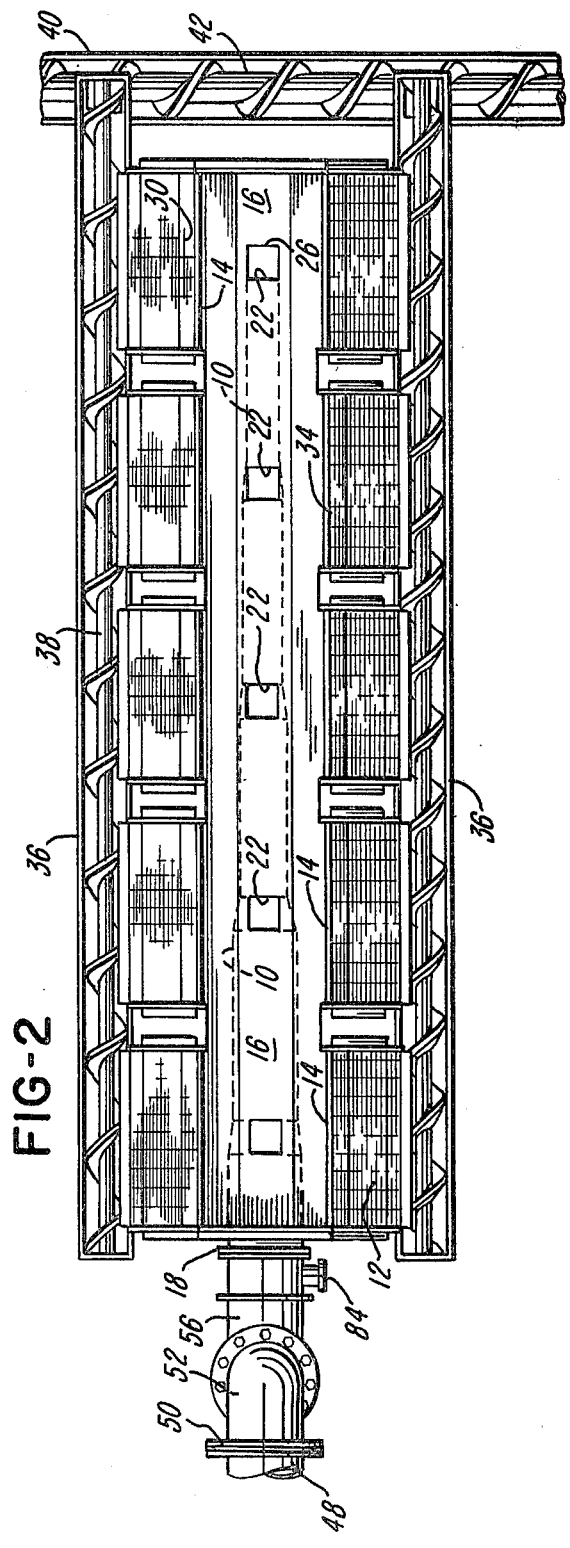
FIG. 2 is a similar top view of the structure of FIG. 1.

In a single operating line of the invention system such as shown in FIGS. 1 and 2 the static screens 12 are arranged in back to back pairs with the respective screens of each pair disposing to opposite sides of the head box 16 and extending therefrom in a downwardly divergent relation. In the example illustrated five such pairs of screens 12 are arranged in a straight line, with the screens to either side of the head box 16 in a side by side, abutting, straight line relation. As thus provided, not only are all the screens in a line served by a common head box connected so it centers between the respective lines of screens to either side thereof but the head box is centered directly over in spaced elevated relation to the top surface of the underlying infeed duct 10.

The steps in the infeed duct 10 have the effect of gradually reducing its cross-sectional area from its inlet end 18 to its remote end 26 in a manner to provide longitudinally spaced sections therein each of which is uniform in cross sectional area.

In the example illustrated the infeed duct 10 has the section thereof of greatest cross-sectional area extend from its inlet 18 to a point just short of that portion of the overlying head box 16 which is centered between the ends of the transverse length of the first pair of screens 12. From this point a short length of the bottom wall 24 which lies directly below the outlet 20 to a first duct section 22 is inclined upwardly towards the top wall of the infeed duct to form a transitional section 11 in the infeed duct which effects a measured reduction in its cross-sectional area. This reduction is uniformly maintained within the infeed duct until it reaches the second outlet 20. A second short section of the bottom wall 24 directly under and substantially coextensive in length with the second outlet 20 is inclined upwardly to form a second transitional section 11 of the duct which further reduces its cross-sectional area. The second outlet 20 and correspondingly the second transitional section 11 is therefore substantially directly below the opening from a second duct section 22 to the head box 16, in a centered relation to the second pair of screens which bound the head box in immediate following relation to the first pair. In the case illustrated the infeed duct 10 is stepped to similarly provide a transitional section 11 thereof immediately under each of the succeeding longitudinally spaced outlets 20 and correspondingly under and in substantially vertical alignment with the outlets from the respectively connected duct extensions 22 to the overlying head box 16.

The measured reduction of the cross-sectional area of the infeed duct 10 is so designed to provide that irrespective of the volume and flow rate within the sewage mains serviced by a line comprising an infeed duct 10 and a line of screens 12 as just described that the flow velocity of the waste water in the infeed duct and at the location of each outlet 20 is uniform. Moreover, by providing each succeeding outlet to locate within the bounds of a transitional section 11 one uniformly provides a conversion of lineal velocity to produce an upward component of force at the point of each transition which lifts a predetermined amount of waste water to and through each outlet 20 and duct 22 to the head box 16. With appropriate design criteria corresponding to the application one can in this manner produce, at the same time, an equal volumetric flow through each outlet 20 and duct 22 in a line which enters the head box 16 between each successive pair of screens. In this manner each of the screens will simultaneously receive a substantially equal and relatively quiescent overflow of the waste water from the head box by way of a weir-like smoothly curved lip 14 which extends a longitudinally extended side edge portion of the head box to the upper end of the flow surface of the adjacent screen.

In preferred embodiments the screen flow surfaces will be comprised of the upper surface portions of bars 30 which are longitudinally spaced and interconnected by transversely spaced underlying bars 32 which form therewith the screen slots 34. In particularly preferred embodiments the composition of the screens will be in accordance with that illustrated in U.S. Pat. No. 3,452,876. The inclination of the screen flow surfaces will be made to suit the application.

Provided at the lower or discharge ends of the screen flow surfaces to either side of the head box 16 are troughs 36 embodying in each case a screw type feeder 38. Thus the solids separated from the flow down the screens 12 at any one side of the head box will slide down the screen flow surfaces and commonly discharge to the trough at their lower end and the screw feeder 38 therein will carry these essentially dewatered solids, both heavies and floatables, to a main discharge trough 40 embodying a screw feeder 42 extending crosswise to the end of the lines of screens remote from the inlet end of the infeed duct which serves waste water to the screens. Of course the trough 40 and screen feeder 42 may be used to receive solids from a number of screen lines as seen in FIG. 5 of the drawings.

Figure 4:
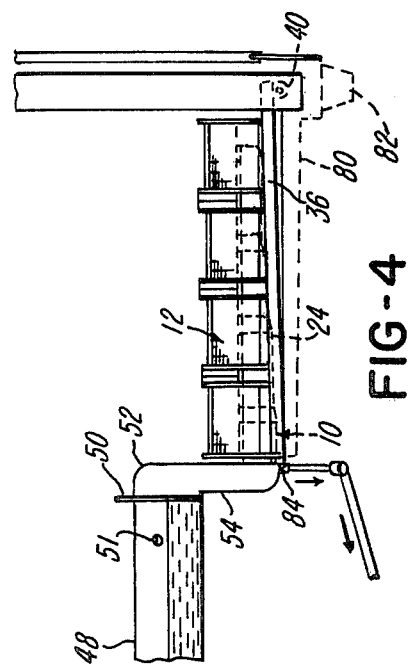
FIG. 4 is a diagrammatic view of a branch connection from a main sewage discharge line to the structure providing a single operation line of a system per the present invention, as shown in FIGS. 1-3.
Figure 5:
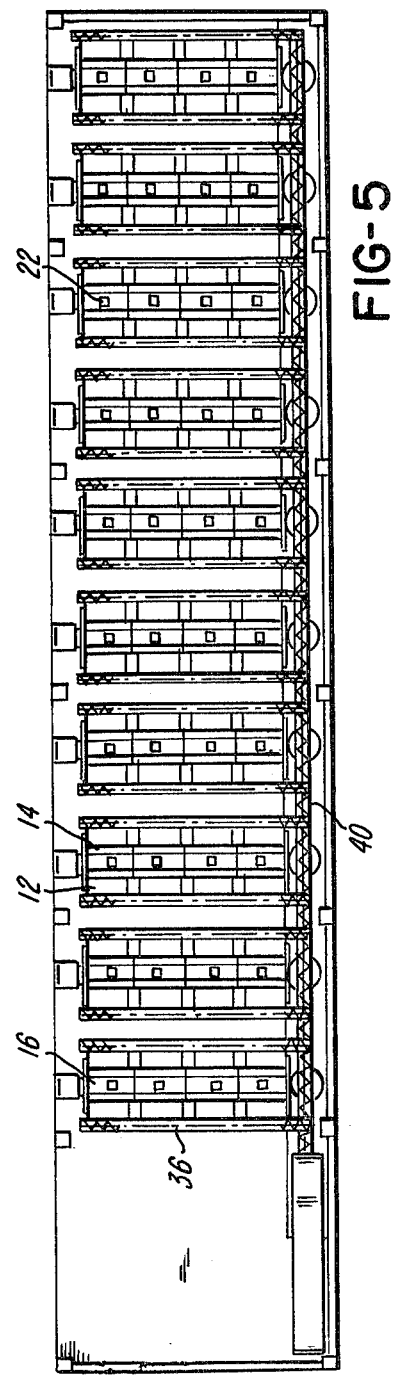
FIG. 5 is a schematic illustration of a complete layout for a typical high capacity installation in accordance with the present invention.

Referring both to FIG. 1 and FIG. 5 together with FIG. 4, it may there be seen that one or more lines in accordance with the present invention may be constructed to service a sewage system and to receive waste water therefrom for preliminary treatment. In either case each infeed duct 10 will receive waste water from the related sewage system by way of a branch line 48 thereof which embodies a normally closed gate valve 50 and immediately preceding this valve a device 51 for sensing the level of the sewage in the branch line 48. When the level is sufficiently high, the sensing device through suitable connections, well known to those versed in this art, will induce an opening of the valve 50.

As seen in the drawings, in the case illustrated the branch line 48 will be at a higher elevation than the inlet 18 of the infeed duct, to which it connects beyond the valve 50 by a first 90° elbow formed duct section 52 followed by a vertically oriented section 54 which is followed in turn by a second elbow formed 90° duct section 56 which connects to the inlet 18 and is extended in a straight line by the infeed duct 10.

As will be obvious several of the invention lines may be embodied in a very large capacity system such as shown in FIG. 5 wherein the lines are closely parallel and the screens of adjacent lines are commonly served by a single solids receiving trough 40 embodying a screw feeder. The result is an exceedingly compact installation.

Figure 3:
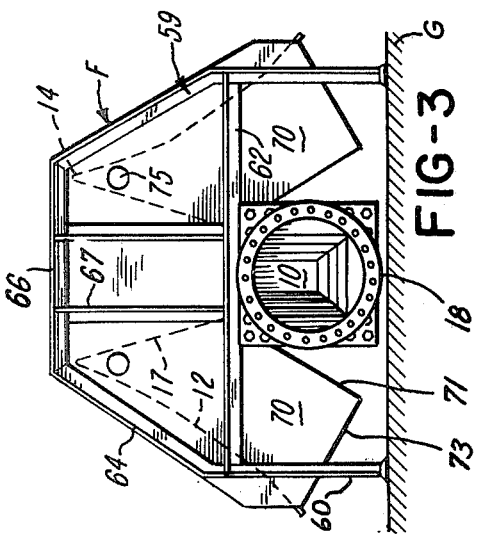
FIG. 3 is a view of the entrance end to the operating line of FIG. 1.

FIG. 3 schematically reveals end section 59 of the framework F of a single waste treatment line which ties together its components. The leg portions 60 of the section 59 project perpendicular to a ground surface G and are transversely spaced, bridged and braced adjacent their upper ends by a horizontal bar member 62. The upper ends of the leg portions 60 are continued by upwardly convergent bar members 64 the uppermost ends of which are spaced and bridged by a bar 66 which centers over and parallel to the bar 62. The bars 62 and 64 are braced by vertically oriented transversely spaced bars 67. The end section 59 is duplicated at the remote end of the line. Intermediate the sections 59 there are a plurality of longitudinally spaced transversely disposed open frame sections constructed to support the head box and screen structure above described. The sections of the framework are tied together by longitudinally extending bars the details of which can be variously contrived to suit the application. The structure of the framework F is therefore not described in further detail except as may be necessary for an understanding of the illustration of the present invention.

The head box 16 is a hopper type receptacle connected to nest in the open top portion of the framework F and to extend in generally continuous fashion between the upper portions of end sections 59. As seen in FIG. 3, the longitudinally extending side wall portions 17 of the head box 16 are upwardly divergent from its bottom 19 which is positioned over and in closely spaced relation to the related infeed duct 10. The screen units 12 which are longitudinally spaced to either side of the head box and extend outwardly and downwardly therefrom are suitably supported in connection with the framework F at its outer longitudinally extending sides and each is connected to the upper end of a side 17 by an arcuately contoured lip portion 14.

Formed in connection with the head box and the screens 12, to the under surface of the screen units, are means defining effluent chambers 70. As will be self-evident, as sewage or waste water moves down the upper flow surface of each screen unit, liquid will be extracted by screen bars 30 and escape through screen slots 34 to the effluent chamber 70 thereunder.

As seen in FIG. 3, the back wall portions of the respective effluent chambers to either side of the head box are comprised of imperforate upper and lower plate sections. The upper plate sections are provided in each case by a side wall portion 17 of the head box. The lower plate sections 71, arranged at the opposite sides of the head box, are in an outwardly and downwardly directed divergent relation and the infeed duct 10 is nested and centered therebetween. Adjacent the lower end thereof the back wall sections 71 each have an opening or openings providing for escape of liquid from the effluent chamber of which it forms a part. Of course suitable conduit means may be used to direct this effluent to any desired location or apparatus. The effluent chambers are completed by wall portions at their ends which are imperforate except for access openings 75 which are normally capped and imperforate bottom wall portions 73 which connect between the lowermost ends of their back wall portions and the lowermost ends of their overlying screen units.

The infeed duct 10 is connected to and suspended from horizontal bar portions of the respective longitudinally spaced sections of the framework F. In the example illustrated the effluent chambers of a single operating line are arranged to commonly discharge to a single trough 80 which gravity drains to a further trough 82 extending transverse to its end remote from its inlet 18. The trough 82 can be used to receive effluent from several lines disposed as shown in FIG. 5 and to commonly discharge the effluent where desired.

The extension of the branch 48 immediately preceding the inlet 18 of the system illustrated in FIGS. 1 to 4 has in its bottom, at a point lowermost with respect to the infeed duct 10, a normally plugged drain opening 84 which can be unplugged when it is desired to clean the infeed duct 10 by having its interior reversely flushed by way of the outlets in the bottom of the head box 16.

Please note that while the head box 16 is shown to be open from one end to the other of an operating line, it can be partitioned if desired, so as to provide a separate head box section serving each pair of opposed outwardly and downwardly divergent screens.

In summary and with reference to the drawings, it will be seen that the system and apparatus of the present invention lends itself to a simple but effective use in handling overloads of sewage and like systems. One or more operating lines may be tied into branches leading from a main and come into play as and when a related sensing device determines the need. As a valve 50 leading to an operating line opens, the liquid and solid composite in advance thereof drops through the connection 52–54 to the level of the related infeed conduit 10 associated with the head box or head boxes 16 in the operating line. As the sewage enters the infeed conduit 10, under the influence of substantial pressure and at a significant velocity the flow is then controlled within the infeed conduit, by reason of its construction, to produce a substantially uniform velocity at each of the outlets 20. By the successive reduction of the cross sectional area of the infeed duct 10 in the area of and immediately below each outlet 20 there is at the point of each transitional section 11 produced a conversion of linear velocity into force components including an upward component which is sufficient to lift a predeterminable amount of the sewage to and through the bottom of the head box 16. The arrangement is such that there are substantially equal amounts of sewage delivered by way of each duct 22 and the controlled flow thereof is such that the sewage will fill the head box substantially uniformly and there will be substantially uniform force effects to insure that the screen units 12 of each pair will have a substantially equal amount of overflow to their downwardly and outwardly directed flow surfaces and the amount and velocity of flow down each screen unit of a line will be substantially equal. The degree of control enabled by the invention construction is such that one can effectively predetermine the requirements of any installation for a given set of conditions. Moreover, the in-line arrangements of the screens at each side of a head box 16 are such to facilitate a simple and effective disposition of the respective solids and liquid content of the sewage. The net result is to enable a sanitary sewage system to avoid malfunction and pollution of the environment so often incident to heavy rainfall and flooding.

The unique simplicity of the invention system enables a quick and easy back flush of the head box and the related infeed conduit to the drain 84, as well as a controlled disposal of the flushing fluid.

Significant in its contribution to the efficiency of the separation achieved by the screen units is the arrangement whereby uniform flow is directed to the screen units in a quiescent non-turbulent manner, irrespective of turbulence in its source.

It will be understood, of course, that while the duct 10 is shown as rectangular, the same can be formed in any suitable cross-section to meet a required need.

From the above description it will be apparent that there is thus provided a system of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A waste water treatment system comprising a plurality of screens presenting descending flow surfaces, means defining a flow conduit commonly feeding said screens and arranged below the upper limits of said flow surfaces, said flow conduit being adapted to receive waste water and having openings therein in constantly open communication with means constructed and arranged to direct waste water from said conduit to flow to the upper ends of said screens for separation of its contents in a movement thereof down said descending flow surfaces, the flow passage defined by said flow conduit being reduced as to its cross sectional area in the vicinity of each of said openings from the cross sectional area of that portion of the flow passage immediately preceding the opening to induce waste water at the locations of said openings to exit from each of said openings to said means for directing the waste water to the upper ends of said screens in substantially equal amounts.

2. A system as in claim 1 wherein said openings are in direct and open communication with head box means forming at least a part of said directing means and said head box means is in free and open communication with the upper ends of said screens to direct waste water thereto by overflow.

3. A system as in claim 1 wherein said flow conduit and said openings are constructed and arranged to simultaneously pass waste water through each of said openings at substantially the same velocity of flow and said directing means are arranged to deliver said waste water to and over the upper ends of said screens in relatively quiescent non-turbulent manner.

4. A system as in claim 1 wherein said screens are arranged in back to back pairs and to form an operating line and said conduit and the openings therefrom are centered with reference to and extend in a sense longitudinally of said line.

5. A system as in claim 4 wherein said directing means includes a head box positioned over said conduit and centered between the screens of each said pair, adjacent the upper ends thereof.

6. A system as in claim 5 wherein the screens to either side of said conduit are arranged in each case in a substantially straight line and each line of said screens is arranged to deliver solids separated thereby to trough means disposed adjacent their lower ends.

7. A system as in claim 6 wherein further trough means are located below said conduit and arranged to commonly receive the effluent passing through said screens as waste water moves over and down their flow surfaces.

8. A system as in any one of claims 5-7 wherein means defining a normally plugged drain is arranged in adjacent relation to what constitutes an inlet to said conduit and at a point lowermost with respect to said conduit and said directing means, said openings in said conduit and said conduit provide a free and open passage enabling a back flush of the system facilitating the maintenance thereof in a sanitary condition.

9. A system as in claim 1 wherein said plurality of screens are arranged in a straight line and said flow conduit is in a straight line and extends substantially coextensive with said screens and in immediately underlying relation thereto.

10. A waste water treatment system comprising a plurality of screens presenting descending flow surfaces, means defining a longitudinally extending flow conduit arranged below the upper limits of said flow surfaces, said flow conduit being adapted to receive waste water and having longitudinally spaced openings from the top thereof, means in open communication with said openings constructed and arranged to direct waste water discharged from said conduit by way of said openings to the upper ends of said screens, and said flow conduit being reduced as to its cross sectional area at the location of each of said openings to induce an upflow of the waste water by way of said openings and arranged to produce a substantially equal volumetric flow through each of said openings at any given time.

11. A system as in claim 10 wherein said flow conduit is successively reduced in cross section and each reduced section commences at a location generally corresponding to the location of one of said openings.

12. A system as in claim 11 wherein said openings are in direct and open communication with head box means forming at least a part of said directing means and said head box means is in free and open communication with the upper ends of said screens to direct waste water thereto by overflow.

13. A system as in claim 11 wherein said screens are arranged in back to back pairs and to form an operating line and said conduit and the openings therefrom are centered with reference to and extend in a sense longitudinally of said line.

14. A system as in claim 10 in connection with a sewage or waste water main or branches thereof wherein a connection from said main or branches is in each case normally blocked by valve means interposed between the main or branch and said plurality of screens which constitutes an operating line of said system and means are included to sense the level of the sewage or waste water in advance of said connection and to induce an opening of said valve means when the same reaches a predetermined level.

15. A system as in claim 10 wherein said openings are in direct and open communication with head box means forming at least a part of said directing means and said head box means is in free and open communication with the upper ends of said screens to direct waste water thereto by overflow.

16. A system as in claim 10 wherein said screens are arranged in back to back pairs and to form an operating line and said conduit and the openings therefrom are centered with reference to and extend in a sense longitudinally of said line.

17. A waste water treatment system, particularly as used in treating large volume flows of sewage and storm water, including a plurality of screens over which waste water flows from upper toward lower limits thereof, head box means receiving the waste for overflow to and downwardly of said screens from their upper limits, a flow conduit positioning longitudinally of said assembly below the upper limits of said screens and communicating with said head box means at longitudinally spaced apart locations corresponding substantially to the locations of individual screens of said assembly, said flow conduit having exit openings at said longitudinally spaced locations successively encountered by waste water flowing therein and being configured to deliver volumes of waste water to said head box means which are substantially equal at all said exit openings irrespective of changes in the volumetric flow through said flow conduit, the configuration of said flow conduit providing for a stepped reduction in the cross sectional area of said flow conduit in the direction of flow therethrough, said flow conduit including inclined transitional surfaces at at least certain of said longitudinally spaced apart locations, and means being provided for draining said flow conduit and communicating head box means from a portion of said flow conduit of larger cross sectional area.

18. A waste water treatment system, particularly as used in treating variable volume flows of sewage and storm water, including an in-line arrangement of screens over which waste water flows from upper toward lower limits thereof, a flow conduit through which waste water is brought to said screens, said conduit extending longitudinally of said line of screens and receiving waste water at one end for flow toward the opposite end, said conduit having longitudinally spaced apart exit openings for an escape of waste water to related respective screens, and the flow passage defined by said conduit being reduced as to its cross-sectional area in the vicinity of each said exit opening to provide a volume of flow to all said screens by way of overflow means which is substantially equal as applied to each said screen irrespective of changes in volumetric flow through said conduit.

* * * * *

UNITED STATES PATENT AND TRADEMARK OFFICE
CERTIFICATE OF CORRECTION

PATENT NO. : 4,235,724

DATED : November 25, 1980

INVENTOR(S) : Marvin E. Ginaven

It is certified that error appears in the above—identified patent and that said Letters Patent is hereby corrected as shown below:

Column 9, line 23, after "waste" should read -- water --.

Signed and Sealed this

Seventeenth Day of August 1982

[SEAL]

Attest:

GERALD J. MOSSINGHOFF

*Attesting Officer*     *Commissioner of Patents and Trademarks*